(12) United States Patent
Jaroch

(10) Patent No.: US 11,086,865 B2
(45) Date of Patent: Aug. 10, 2021

(54) SLIDING WINDOW PATTERN MATCHING FOR LARGE DATA SETS

(71) Applicant: Colossio, Inc., Chicago, IL (US)

(72) Inventor: Joseph A. Jaroch, Chicago, IL (US)

(73) Assignee: Colossio, Inc., Chicago, IL (US)

(*) Notice: Subject to any disclaimer, the term of this patent is extended or adjusted under 35 U.S.C. 154(b) by 423 days.

(21) Appl. No.: 15/921,303

(22) Filed: Mar. 14, 2018

(65) Prior Publication Data

US 2019/0286730 A1 Sep. 19, 2019

(51) Int. Cl.
*G06F 16/00* (2019.01)
*G06F 16/2453* (2019.01)
*G06F 16/242* (2019.01)
*G06F 16/2457* (2019.01)

(52) U.S. Cl.
CPC .... *G06F 16/24532* (2019.01); *G06F 16/2425* (2019.01); *G06F 16/24542* (2019.01); *G06F 16/24578* (2019.01)

(58) Field of Classification Search
CPC .......... G06F 16/24542; G06F 16/2425; G06F 16/24532; G06F 16/24578
See application file for complete search history.

(56) References Cited

U.S. PATENT DOCUMENTS

| | | | | |
|---|---|---|---|---|
| 8,521,774 B1* | 8/2013 | Cai | ............ | G06F 16/24556 707/776 |
| 9,430,519 B1* | 8/2016 | Cai | ............ | G06F 16/24556 |
| 10,216,805 B1* | 2/2019 | Cai | ............ | G06F 16/24556 |
| 2010/0063948 A1* | 3/2010 | Virkar | ............ | G06N 20/00 706/12 |
| 2010/0332475 A1* | 12/2010 | Birdwell | ............ | G06F 16/283 707/737 |
| 2013/0173632 A1* | 7/2013 | Birdwell | ............ | G06F 16/24578 707/743 |
| 2013/0339350 A1* | 12/2013 | Wei | ............ | G06Q 30/02 707/723 |
| 2015/0317344 A1* | 11/2015 | Birdwell | ............ | G06F 16/2264 707/797 |
| 2016/0170996 A1* | 6/2016 | Frank | ............ | G06F 16/24578 707/748 |
| 2016/0300252 A1* | 10/2016 | Frank | ............ | G06F 16/24578 |
| 2018/0150512 A1* | 5/2018 | Merker | ............ | G06F 16/24542 |
| 2019/0361890 A1* | 11/2019 | Rogynskyy | ............ | G06F 16/215 |

* cited by examiner

*Primary Examiner* — Jean M Corrielus

(74) *Attorney, Agent, or Firm* — Barnes & Thornburg LLP

(57) ABSTRACT

Methods for providing sliding window pattern matching for large data sets are provided. In one aspect, a method includes accessing a data store comprising a plurality of records each associated with a timestamp and at least one type of measurement value. The method also includes retrieving a multidimensional search query spanning a defined length of time. The method also includes iteratively searching the plurality of records using the multidimensional search query, which is successively reduced in size. Each iteration uses an optimization function to determine similarity values. Once a match with an optimal confidence value is found, the iterative search can be halted. The method also includes outputting a prediction result selected from the plurality of records having associated timestamps after the candidate match assigned to the optimal confidence value. Systems and machine-readable media are also provided.

9 Claims, 9 Drawing Sheets

Iteration 1: Results for 3x3x3 Sized Search Query — 410A

| Comparison | Multidimensional Data Range [x, y, time] | Similarity Value | Confidence Value |
|---|---|---|---|
| 1 | [A, 1, 0] – [C, 3, 2] | 0.05 | 0.05 |
| 2 | [A, 2, 0] – [C, 4, 2] | 0.16 | 0.16 |
| 3 | [A, 3, 0] – [C, 5, 2] | 0.20 | 0.20 |
| 4 | [A, 4, 0] – [C, 6, 2] | 0.12 | 0.12 |
| 5 | [A, 5, 0] – [C, 7, 2] | 0.01 | 0.01 |
| 6 | [A, 6, 0] – [C, 8, 2] | 0.25 | 0.25 |
| 7 | [A, 7, 0] – [C, 9, 2] | 0.40 | 0.40 |
| 8 | [B, 1, 0] – [D, 3, 2] | 0.80 | 0.80 |
| 9 | [B, 2, 0] – [D, 4, 2] | 0.62 | 0.62 |
| ... | ... | ... | ... |
| 146 | [G, 6, 2] – [I, 8, 4] | 0.18 | 0.18 |
| 147 | [G, 7, 2] – [I, 9, 4] | 0.15 | 0.15 |

420A

Iteration 2: Results for 2x2x3 Sized Search Query — 410B

| Comparison | Multidimensional Data Range [x, y, time] | Similarity Value | Confidence Value |
|---|---|---|---|
| 1 | [A, 1, 0] – [B, 2, 2] | 0.05 | 0.04 |
| 2 | [A, 2, 0] – [B, 3, 2] | 0.16 | 0.13 |
| 3 | [A, 3, 0] – [B, 4, 2] | 0.20 | 0.16 |
| 4 | [A, 4, 0] – [B, 5, 2] | 0.12 | 0.10 |
| 5 | [A, 5, 0] – [B, 6, 2] | 0.01 | 0.01 |
| 6 | [A, 6, 0] – [B, 7, 2] | 0.25 | 0.20 |
| 7 | [A, 7, 0] – [B, 8, 2] | 0.40 | 0.32 |
| 8 | [A, 8, 0] – [B, 9, 2] | 0.35 | 0.28 |
| 9 | [B, 1, 0] – [C, 2, 2] | 0.80 | 0.64 |
| ... | ... | ... | ... |
| 191 | [H, 7, 2] – [I, 8, 4] | 0.18 | 0.14 |
| 192 | [H, 8, 2] – [I, 9, 4] | 0.15 | 0.12 |

SLIDING WINDOW PATTERN MATCHING
FOR LARGE DATA SETS

TECHNICAL FIELD

The present disclosure generally relates to databases, and more specifically relates to sliding window pattern matching for large data sets.

BACKGROUND

Complex systems such as weather, medicine, finance, and others present a challenge for designing effective prediction models. Significant computing resources are required to solve complex multi-variable equations with large data sets. Moreover, to produce a solution in a reasonable amount of time, the data sets must often be pruned to highly localized data sets for practical use within the prediction models. Since highly relevant data points may be potentially omitted from consideration, the models may return inaccurate prediction results.

The description provided in the background section should not be assumed to be prior art merely because it is mentioned in or associated with the background section. The background section may include information that describes one or more aspects of the subject technology.

SUMMARY

The disclosed system provides sliding window pattern matching for large data sets. An entire data set is iteratively searched using a multidimensional search query that is successively reduced in size. Parallel processing techniques enable the iterative search to complete in less time using less computational resources compared to predictive systems that require the solving of complex multi-variable equations. Once a match with an optimal confidence value is found, the iterative search can be halted, and data records with timestamps after the match can be output to provide a predictive result. Optionally, multiple closest matches can be averaged together.

According to certain aspects of the present disclosure, a computer-implemented method is provided. The method includes accessing a data store comprising a plurality of records each associated with a timestamp and at least one type of measurement value. The method also includes retrieving a multidimensional search query spanning a defined length of time. The method also includes comparing each of a plurality of candidates to the multidimensional search query using an optimization function to determine an associated similarity value, wherein the plurality of candidates cover an entirety of the plurality of records. The method also includes selecting a candidate match from the plurality of candidates based on the candidate match having a highest associated similarity value. The method also includes assigning a confidence value to the candidate match based at least on the associated similarity value and a size of the multidimensional search query. The method also includes reducing the size of the multidimensional search query. The method also includes repeating the comparing, selecting, assigning, and reducing until an optimal confidence value is determined. The method also includes outputting a prediction result selected from the plurality of records having associated timestamps after the candidate match assigned to the optimal confidence value.

According to certain aspects of the present disclosure, a system is provided including a memory, and a processor configured to execute instructions. When executed, the instructions cause the processor to access a data store comprising a plurality of records each associated with a timestamp and at least one type of measurement value. The instructions also cause the processor to retrieve a multidimensional search query spanning a defined length of time. The instructions also cause the processor to compare, in parallel, each of a plurality of candidates to the multidimensional search query using an optimization function to determine an associated similarity value, wherein the plurality of candidates cover an entirety of the plurality of records, and wherein the optimization function uses at least one of sparse pattern matching and relative pattern matching. The instructions also cause the processor to select a candidate match from the plurality of candidates based on the candidate match having a highest associated similarity value. The instructions also cause the processor to assign a confidence value to the candidate match based at least on the associated similarity value and a size of the multidimensional search query. The instructions also cause the processor to reduce the size of the multidimensional search query. The instructions also cause the processor to repeat the comparing, selecting, assigning, and reducing until an optimal confidence value is determined. The instructions also cause the processor to output a prediction result selected from the plurality of records having associated timestamps after the candidate match assigned to the optimal confidence value.

According to certain aspects of the present disclosure, a non-transitory machine-readable storage medium is provided that includes machine-readable instructions for providing sliding window pattern matching for large data sets. The method includes accessing a data store comprising a plurality of records each associated with a timestamp and at least one type of measurement value. The method also includes retrieving a multidimensional search query spanning a defined length of time. The method also includes comparing, in parallel, each of a plurality of candidates to the multidimensional search query using an optimization function to determine an associated similarity value, wherein the plurality of candidates cover an entirety of the plurality of records, and wherein the optimization function uses at least one of sparse pattern matching and relative pattern matching. The method also includes selecting a candidate match from the plurality of candidates based on the candidate match having a highest associated similarity value. The method also includes assigning a confidence value to the candidate match based at least on the associated similarity value and a size of the multidimensional search query. The method also includes reducing the size of the multidimensional search query. The method also includes repeating the comparing, selecting, assigning, and reducing until an optimal confidence value is determined. The method also includes outputting an averaged prediction result selected from the plurality of records having associated timestamps after multiple candidate matches most closely assigned to the optimal confidence value.

According to certain aspects of the present disclosure, a system is provided. The system includes a means for accessing a data store comprising a plurality of records each associated with a timestamp and at least one type of measurement value, and for retrieving a multidimensional search query spanning a defined length of time. The system includes a means for comparing each of a plurality of candidates to the multidimensional search query using an optimization function to determine an associated similarity value, wherein the plurality of candidates cover an entirety of the plurality of records, for selecting a candidate match from the plurality of candidates based on the candidate match having a highest associated similarity value, for assigning a confidence value to the candidate match based at least on the associated similarity value and a size of the multidimensional search query, for reducing the size of the multidimensional search query, and for repeating the comparing, selecting, assigning, and reducing until an optimal confidence value is determined. The system includes a means for outputting a prediction result selected from the plurality of records having associated timestamps after the candidate match assigned to the optimal confidence value.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate aspects of the subject technology, and together with the description serve to explain the principles of the subject technology. In the drawings:

FIG. 4D illustrates example results from search query iterations for providing sliding window pattern matching for large data sets.

Figure 1:
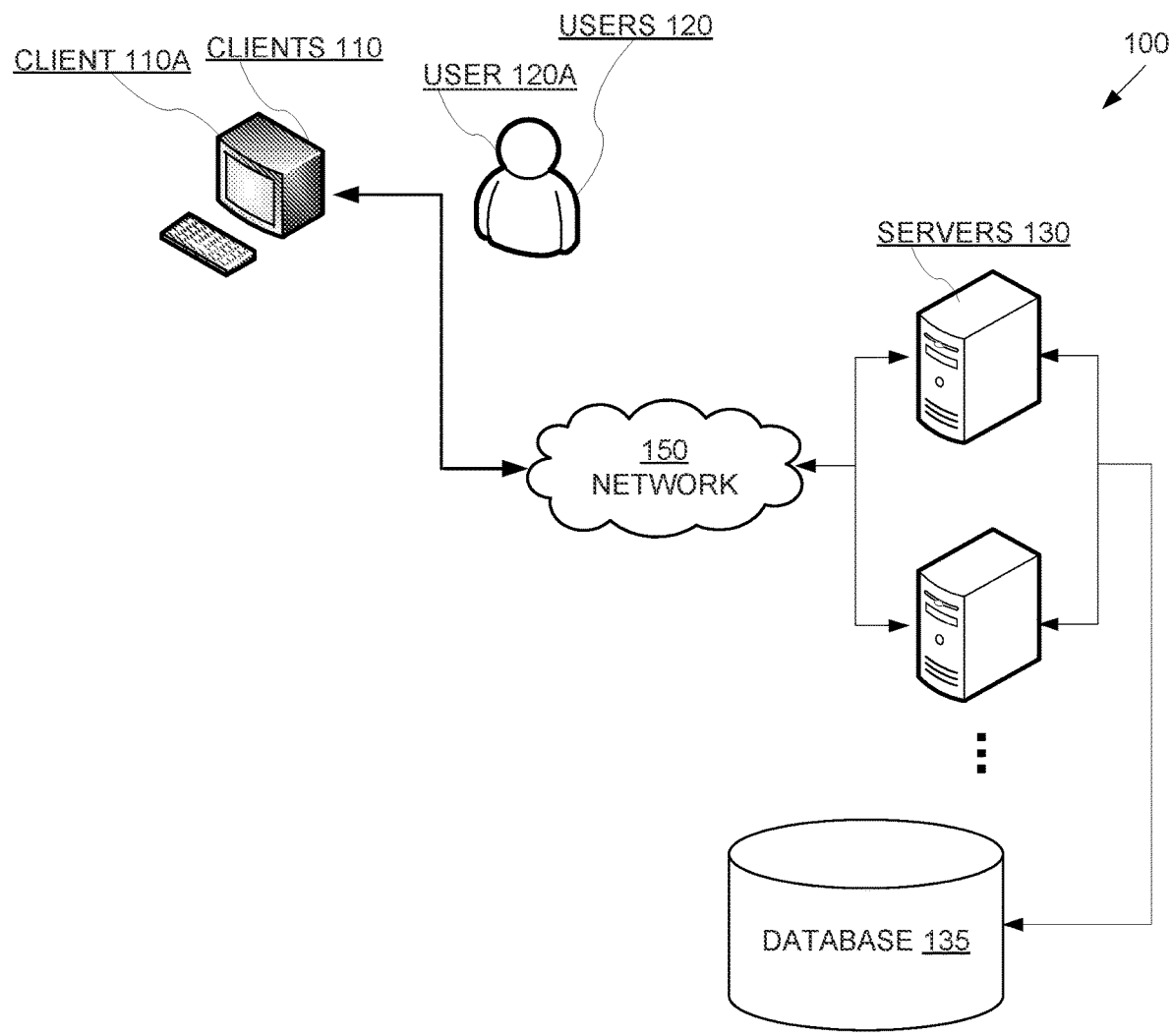
FIG. 1 illustrates an example architecture for providing sliding window pattern matching for large data sets.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

As discussed above, providing predictions for complex systems is often a difficult and computationally intensive task. Using weather prediction as an example, conventional weather prediction systems might attempt to solve complex multi-variable systems that model weather systems using fluid dynamics. This process requires significant computational resources, and thus may only consider only a small portion of available weather data, such as localized data relevant to the geographical region being forecasted. As a result, the prediction system cannot consider the weather system in its entirety. Since many complex systems can be considered to be closed systems with internal interactions, pruning a large portion of data from such systems can result in inaccurate predictions.

The disclosed system provides a way to provide accurate predictions for such complex systems. Rather than attempting to directly solve a set of equations to predict an outcome, an entire database of historical data, such as weather data, can be analyzed against a set of observations that forms a multidimensional search query. By using an optimization function to find closest matches within the entire database, the data for events that occur after the closest matches can be used to make predictions for the search query. While this approach requires computational resources for the optimization function, the database comparisons can be divided for highly parallel processing on distributed architectures, such as graphics processing units (GPUs), multi-core central processing units (CPUs), ASICs, and other highly parallel devices. Since the optimization function may use relatively simple operations, this approach may utilize less computational resources and provide a prediction result in less computational time compared to attempting to solve a complex multi-variable system. With a sufficiently robust data set, the prediction result may also be highly accurate.

The disclosed system addresses a technical problem tied to computer technology and arising in the realm of computer networks, namely the technical problem of providing system predictions. The disclosed system solves this technical problem by performing sliding window pattern matching for large data sets. By performing pattern matching on highly parallel architectures, a prediction result can be provided more quickly than solving a multi-variable equation system. Thus, performance of the computer itself can be improved. The pattern matching may use an optimization function that considers relative matches and sparse matches, providing flexibility to match to similar but not exact matches. Additionally, by comparing the predictions with actual observed results, the system can be adjusted to provide more accurate predictions for future queries. Thus, predictions can be provided with higher accuracy.

Example System Architecture

FIG. 1 illustrates an example architecture 100 for providing sliding window pattern matching for large data sets. The architecture 100 includes clients 110 and servers 130 connected over a network 150. Servers 130 may connect and communicate with database 135, for example over a local intranet. In some aspects of the subject technology, servers 130 may instead connect to database 135 over network 150. Users 120 may interact with respective clients 110.

The clients 110 may access an interface, such as a graphical user interface or command line interface, to provide a prediction query for processing by servers 130. Alternatively, clients 110 may be configured to automatically submit a prediction query to server 130, for example by using a script or scheduled task. Servers 130 may process the prediction query against database 135, which may contain historical data related to the prediction query. The prediction result may be provided back to clients 110 and optionally added to database 135.

The clients 110 can be any device having an appropriate processor, memory, and communications capability for providing the prediction queries to servers 130. The clients 110 to which the servers 130 are connected over the network 150 can be, for example, desktop computers, mobile computers, tablet computers (e.g., including e-book readers), mobile devices (e.g., a smartphone or PDA), set top boxes (e.g., for a television), video game consoles, or any other devices having appropriate processor, memory, and communications capabilities.

One of the many servers 130 is configured to host a prediction query service. For the purposes of load balancing, multiple servers 130 can host the prediction query service. In certain aspects, one or more of the servers 130 can be a cloud computing server of an infrastructure-as-a-service (IaaS), and be able to support a platform-as-a-service (PaaS) and software-as-a-service (SaaS) services.

The prediction query service receives the prediction queries from clients 110 and retrieves an appropriate multidimensional search query corresponding to the prediction query, which may be retrieved from database 135. Database 135 is searched iteratively using correspondingly reduced size versions of the multidimensional search query until converging to a match with an optimal confidence value. Subsequent data records with timestamps after the match may be used to provide a prediction result for responding to the prediction query. A log of decisions used in the searching process may be generated for validation. Optionally, multiple closest matches may be averaged for the prediction result.

The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

Figure 2:
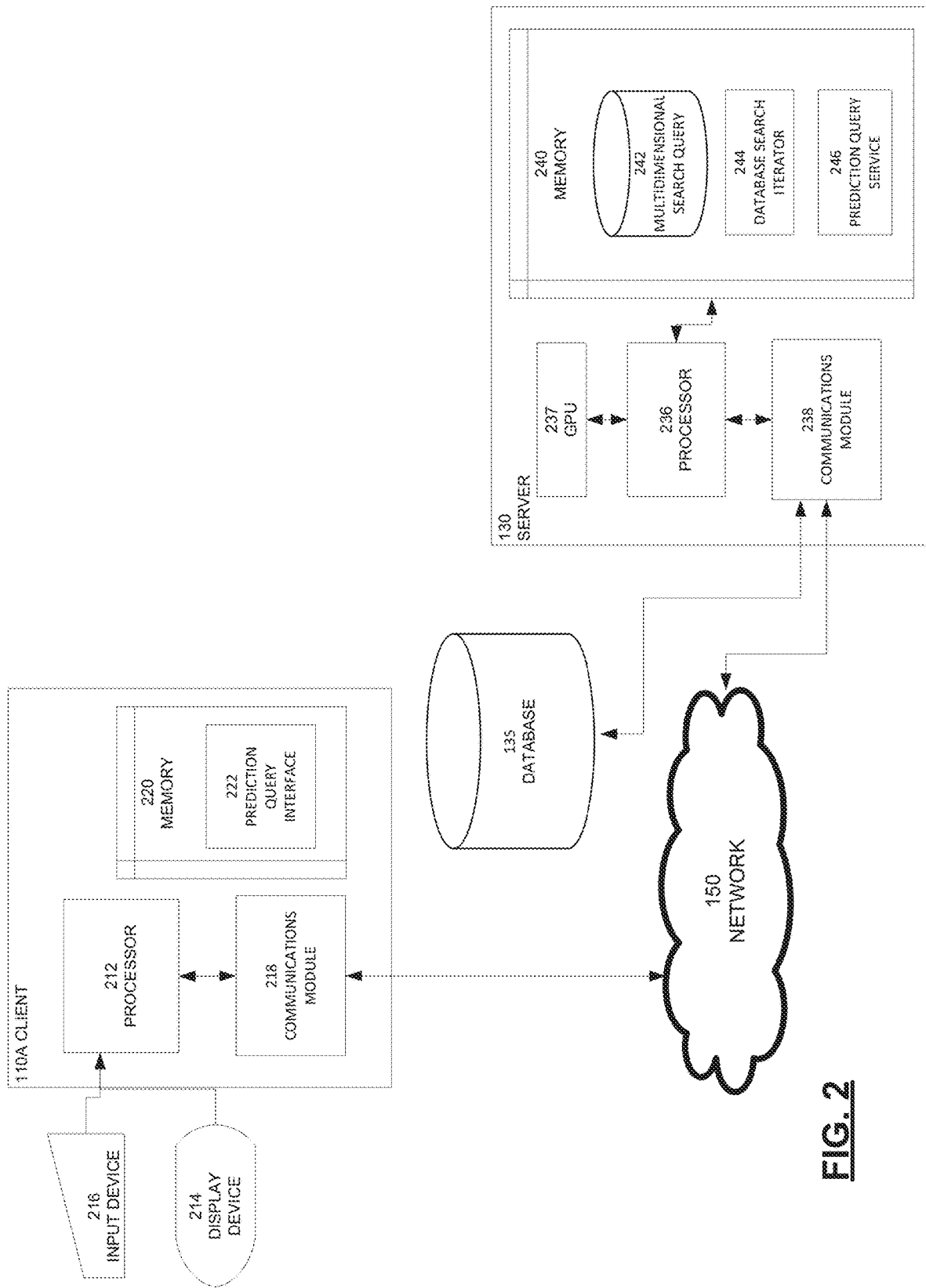
FIG. 2 is a block diagram illustrating the example clients and servers from the architecture of FIG. 1 according to certain aspects of the disclosure.

Example System for Providing Sliding Window Pattern Matching for Large Data Sets FIG. 2 is a block diagram illustrating an example server 130, client 110A, and database 135 from the architecture of FIG. 1 according to certain aspects of the disclosure. The client 110A and server 130 are connected over the network 150 via respective communications modules 218 and 238. The communications modules 218 and 238 are configured to interface with the network 150 and to receive information, such as data, requests, responses, and commands to other devices on the network. The communications modules 218 and 238 can be, for example, modems or Ethernet cards. Server 130 may also communicate with database 135 using communications module 238, for example, to issue database queries and add database records. In some aspects of the present technology, server 130 may directly access the underlying data of database 135 without interfacing with a database management system.

A desktop computer, or client 110A, is associated with user 120A and includes processor 212, communications module 218, and memory 220. The client 110A also includes an input device 216, such as a keyboard or mouse, a display device 214, such as a liquid crystal display (LCD), and an imaging device 215, such as a camera. The processor 212 of the client 110A is configured to execute instructions, such as instructions physically coded into the processor 212, instructions received from software in memory 220, or a combination of both. For example, the processor 212 of client 110A may execute prediction query interface 222, which may provide a command line or graphical user interface for submitting prediction queries. User 120A may use input device 216 with prediction query interface 222 to submit a prediction query. Alternatively, as discussed above, client 110A may also be configured to automatically generate prediction queries. For example, client 110A may be configured with a scheduled daily task to submit a prediction query for the next day's weather in a particular city. After receiving the prediction query, client 110A may send the prediction query to server 130 via network 150.

Although not specifically shown in FIG. 2, other users and associated clients may also be in communication with servers 130 over network 150. The other clients may include components similar to those shown in client 110A in FIG. 2.

Server 130 includes processor 236, graphics processing unit (GPU) 237, communications module 238, and memory 240, which includes multidimensional search query 242, database search iterator 244, and prediction query service 246. The processor 236 of the server 130 is configured to execute instructions, such as instructions physically coded into the processor 236, instructions received from software in memory 240, or a combination of both.

For example, the processor 236 of the server 130 executes instructions in prediction query service 246 to receive prediction queries from clients 110, such as client 110A. In some aspects of the present technology, server 110 may automatically generate prediction queries, which are provided to prediction query service 246. Prediction query service 246 may retrieve multidimensional search query 242 based on the received prediction query. Depending on the record coverage of database 135, multidimensional search query 242 may be retrieved from database 135. Prediction query service 246 may utilize database search iterator 244 to iteratively search database 135 against multidimensional search query 242 using an optimization function. Database search iterator 244 may continuously reduce the size of multidimensional search query 242 for successive iterations. Once a match (or closest matches) with an optimal confidence value is determined, the records in database 135 with timestamps after the match may be examined to provide a prediction result. The prediction result may then be provided back to the original requester, e.g. client 110A. Optionally, prediction query service 246 may generate a log file during processing to provide a traceable decision record for validation or verification.

The techniques described herein may be implemented as method(s) that are performed by physical computing device (s), as one or more non-transitory computer-readable storage media storing instructions which, when executed by computing device(s), cause performance of the method(s), or, as physical computing device(s) that are specially configured with a combination of hardware and software that causes performance of the method(s).

Figure 3A:
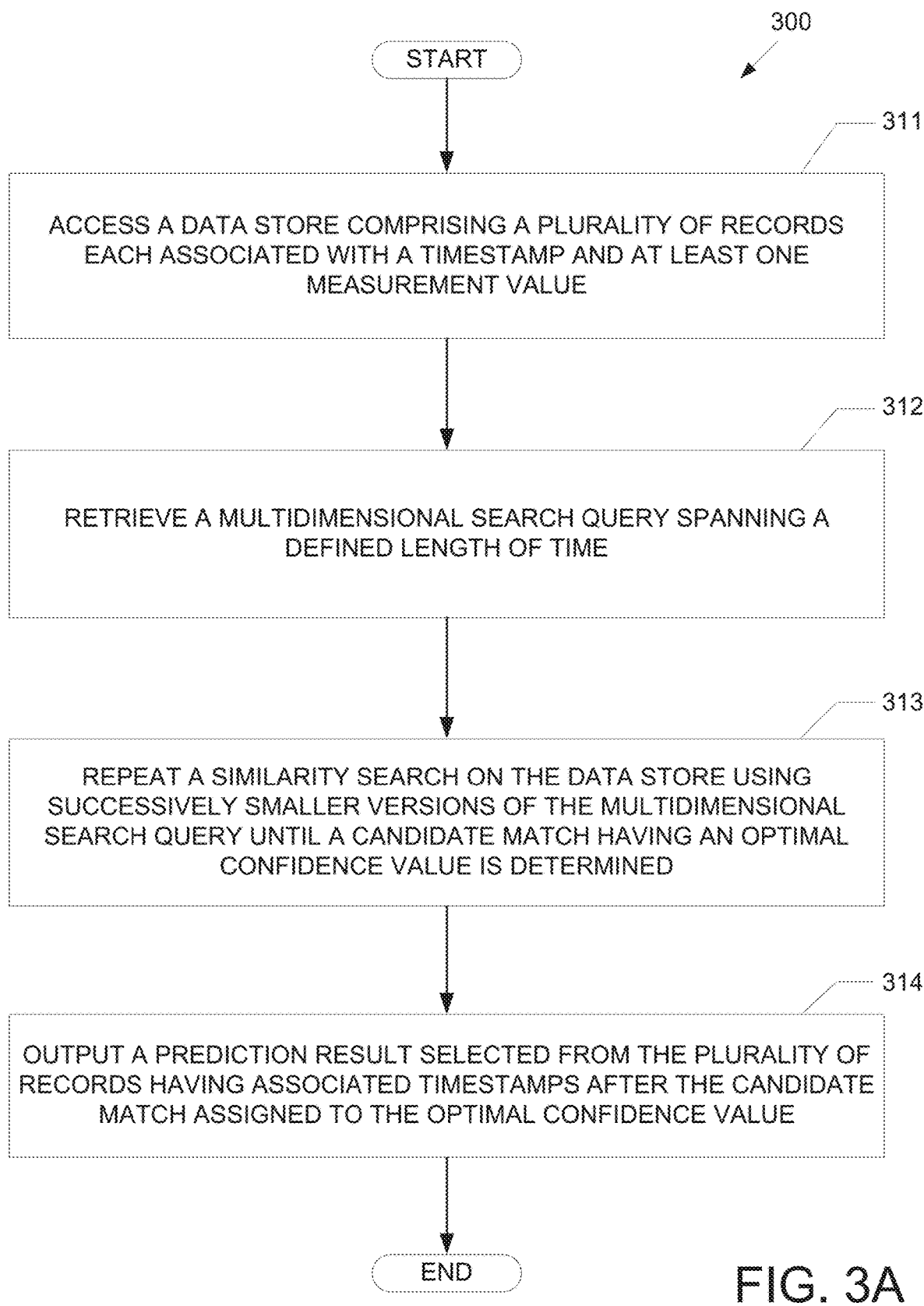
FIG. 3A and FIG. 3B illustrate an example process for providing sliding window pattern matching for large data sets using the example server of FIG. 2.

FIG. 3A illustrates an example process 300 for providing sliding window pattern matching for large data sets using the example server 130 of FIG. 2. While FIG. 3A is described with reference to FIG. 2, it should be noted that the process steps of FIG. 3 may be performed by other systems.

The process 300 begins by proceeding to step 311, where processor 236 accesses database 135 comprising a plurality of records associated with a timestamp and at least one type of measurement value. As shown in FIG. 2, server 130 may directly access database 135 via communications module 238. In other aspects of the present technology, server 130 may access database 135 via network 150, or database 135 may be directly hosted on server 130.

For example, using a weather forecasting example, database 135 may include records for weather related measurements, such as temperature high, temperature low, barometric pressure, and other measurement values. Database 135 may also include measurement values that may have less obvious or indirect effects on weather, such as moon cycles, magnetic declination, and other values. The records may be identified by key values, which may, for example, include an x coordinate or longitude, a y coordinate or latitude, and a timestamp. Database 135 may be a very large data set, for example covering decades of weather data for regions across the world.

In step 312, processor 236 retrieves multidimensional search query 242 spanning a defined length of time. For example, as discussed above, the prediction query may correspond to forecasting the next day's weather for a particular city identified by latitude and longitude coordinates. Prediction query service 246 may be configured with default settings to generate an appropriately sized search query from the prediction query. Thus, as an example, the query for the next day's weather may retrieve a multidimensional search query 242 that is sized to include today's weather, yesterday's weather, and the weather from two days ago for the particular city and its surrounding regions. For example, assuming daily measurements and a granularity of 0.1 degrees between latitude and longitude values for records in database 135, and assuming the particular city is located at 40.7 N, 70.0 W, then the region size may include a 3×3 region defined from 40.6 N, 69.9 W to 40.8 N, 70.1 W. Since the defined length of time is for three (3) days of weather, the multidimensional search query 242 represents a logical 3×3×3 sized block. Of course, any initial size can be chosen based on the system being analyzed and past prediction experiences. Further, while this example uses a three-dimensional query, any number of dimensions may be utilized. The default settings may be dynamically adjusted over time based on the accuracy of the prediction results when compared to actual observed results.

If database 135 is continuously updated to include recent weather, then the multidimensional search query 242 may simply be retrieved directly from database 135. Otherwise, multidimensional search query 242 may be retrieved at least in part from data stored on server 130, from data retrieved from a remote server, such as a weather service, and/or from data polled from measurement or sensor devices, for example a thermometer device to retrieve today's temperature readings.

In step 313, processor 236 repeats a similarity search on database 135 using successively smaller versions of multidimensional search query 242 until a candidate match having an optimal confidence value is determined. Thus, step 313 corresponds to an execution of database search iterator 244. A more detailed description of step 313 is provided in conjunction with FIG. 3B below.

In step 314, processor 236 outputs a prediction result selected from the plurality of records having associated timestamps after the candidate match assigned to the optimal confidence value. In other words, once the candidate match is found, then successive records immediately after the candidate match can be examined to generate the prediction result. Optionally, multiple closest candidate matches may be determined and the successive records may be averaged together to provide an averaged prediction result. The prediction result may be provided back to the original requester, for example client 110A. Client 110A may then display the prediction result, for example on display device 214. As discussed above, an optional log file may also be generated and provided as well.

Further, the prediction result may be stored in database 135 for future comparison. For example, after the next day arrives, the actual weather conditions can be observed and recorded and compared against the prediction result. Depending on a difference between the prediction result and the actual observed result, various settings of the prediction system can be adjusted to provide more accurate predictions, including but not limited to the optimization function, the defined length of time for the multidimensional search query, or a size of subsequent multidimensional search queries.

Figure 3B:
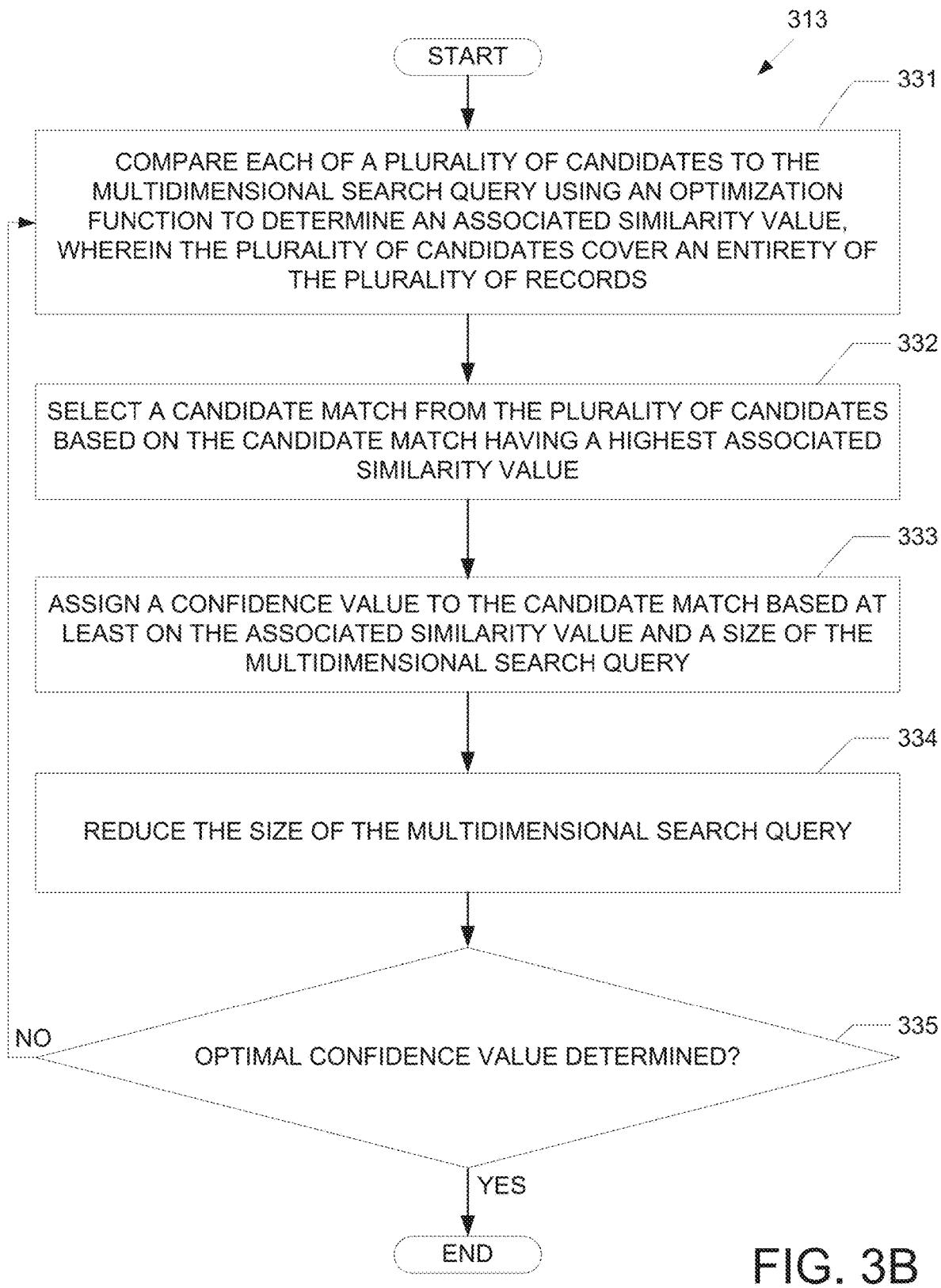

FIG. 3B illustrates an example process 313 for providing sliding window pattern matching for large data sets using the example server 130 of FIG. 2. While FIG. 3A is described with reference to FIG. 2, it should be noted that the process steps of FIG. 3 may be performed by other systems. Process 313 in FIG. 3B may correspond to step 313 in FIG. 3A.

Figure 4A:
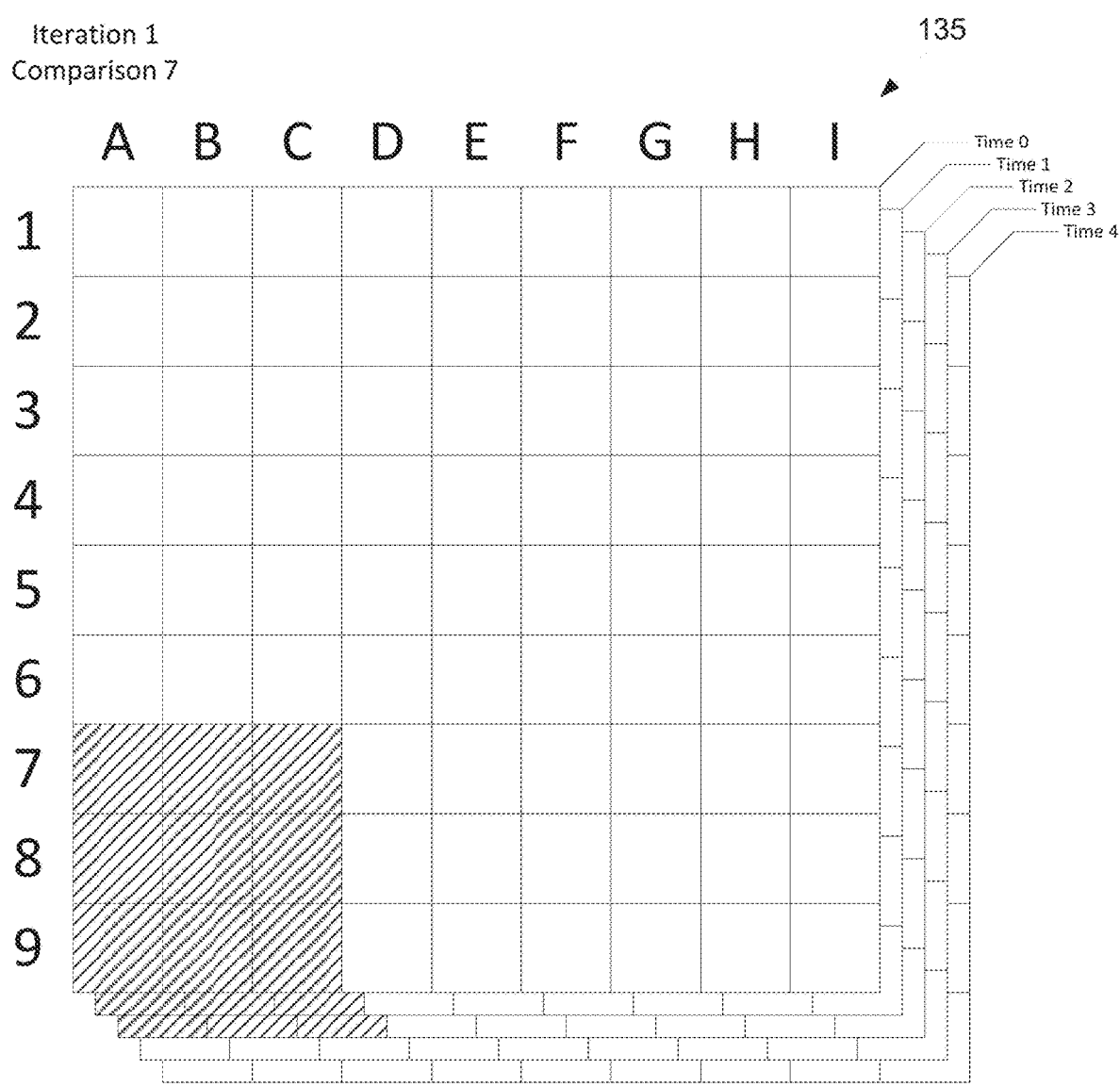
FIG. 4A, FIG. 4B, and FIG. 4C illustrate example search query comparisons for providing sliding window pattern matching for large data sets.

The process 313 begins by proceeding to step 331, where processor 236 compares each of a plurality of candidates to multidimensional search query 242 using an optimization function to determine an associated similarity value, wherein the plurality of candidates cover an entirety of the plurality of records in database 135. For example, FIG. 4A illustrates an example search query comparison for providing sliding window pattern matching for large data sets. As shown in FIG. 4A, database 135 includes records identified by X position, or longitude, Y position, or latitude, and timestamp. As discussed above, database 135 may comprise a very large data set, for example decades of daily weather data recorded for worldwide regions. However, for simplicity and illustration purposes, the records in FIG. 4A only span from A through I for the X position, 1 through 9 for the Y position, and time 0 to time 4 for the timestamp. X positions may be separated by 0.1 longitude increments, Y positions may be separated by 0.1 latitude increments, and Z positions or timestamps may be separated by daily increments. Thus, a total of 9×9×5 or 405 records are provided in database 135. Since the candidates may be equal to the size of multidimensional search query 242, or 3×3×3 in this example, database 135 may include 147 possible candidates. If multidimensional search query 242 is retrieved from database 135, then candidates that contain multidimensional search query 242 may be skipped in step 331.

A sample multidimensional search query 242 is shown in FIG. 4A using the example 3×3×3 logical size as discussed above. Time t may represent the current day. An example database record 248 is also illustrated, which is associated with several measurements or data fields of various data types including latitude, longitude, timestamp, temperature high, temperature low, barometric pressure, moon cycle, and magnetic declination. At least some of these data types may correspond to a floating point data type.

Each data record in multidimensional search query 242 may contain data fields similar to those shown in database record 248. Similarly, the data records in database 135 may contain data fields similar to those illustrated in database record 248. However, the data fields do not necessarily need to match between multidimensional search query 242 and database 135, and inference matching or observed correlations may be utilized to match one or more differing data fields from multidimensional search query 242 to database 135.

As shown in FIG. 4A, the illustrated comparison is for "Iteration 1, Comparison 7." In other words, this is the first iteration, where multidimensional search query 242 is used as-is without reducing in size. Comparisons may be ordered to progress from top-down from index 1 to 9 for Y position, left-right from index A to I for X position, and inwards from index 0 to 4 for Z position. Thus, comparison 1 begins at [A, 1, 0], comparison 2 begins at [A, 2, 0], and so forth until comparison 7, which begins at [A, 7, 0] and ends at [C, 9, 2], as illustrated by the shaded portions of database 135 in FIG. 4A. Of course, the illustrated ordering of the comparisons is arbitrary and any ordering may be chosen.

The comparisons may be performed in one or more parallel passes, for example by using multiple threads executing on processor 236 and/or GPU 237 of multiple servers 130. Further, one may note that adjacent comparisons may share some comparison work. In some aspects of the present technology, the parallel processing may be organized such that the work performed by adjacent comparisons in one parallel pass may be cached to avoid duplicate work in future parallel passes.

The particular comparison 7 illustrated in FIG. 4A thus compares multidimensional search query 242 to the records [A, 7, 0] through [C, 9, 2] in database 135 using an optimization function. The optimization function allows a similarity value to be assigned to enable data matching even if the data does not exactly match. For example, the optimization function may use sparse pattern matching, wherein a pattern in multidimensional search query 242 may be matched to a sparse version of the pattern in database 135. For example, assume that [A, 1, t-2], [B, 1, t-2], and [C, 1, t-2] in multidimensional search query 242 correspond to temperature high values of 40, 45, and 42, respectively. Further, assume that [A, 7, 0], [A, 8, 0], and [B, 9, 0] in database 135 have respective temperature high values of 40, 45, and 42. In this case, the pattern demonstrated by [A, 1, t-2] through [C, 1, t-2] may be matched to the sparse values represented by the three matching data points in database 135. Of course, the optimization function may assign such a sparse match a lower similarity score than an exact match.

Similarly, the optimization function may also use relative pattern matching. For example, continuing with the same example above for the sparse matching, the temperature high values of 40, 45, and 42 in [A, 1, t-2] through [C, 1, t-2] in multidimensional search query 242 differ relatively by +5 and -3. Assume that [A, 7, 0], [B, 7, 0], and [C, 7, 0] include respective temperature high values of 30, 35, and 31. Since the relative differences in [A, 7, 0] through [C, 7, 0] exhibit a relative pattern of +5 and -4, which is similar to the pattern of +5 and -3 in the search query, a relative match may be identified. As with sparse matches, the optimization function may assign such a relative match a lower similarity score than an exact match. Further, sparse matches and relative matches may be combined together. Thus, the optimization function may utilize one or more fuzzy logic matching algorithms to identify and assign similarity scores for similar but not exact matches between multidimensional search query 242 and the compared data records of interest in database 135.

Figure 4B:
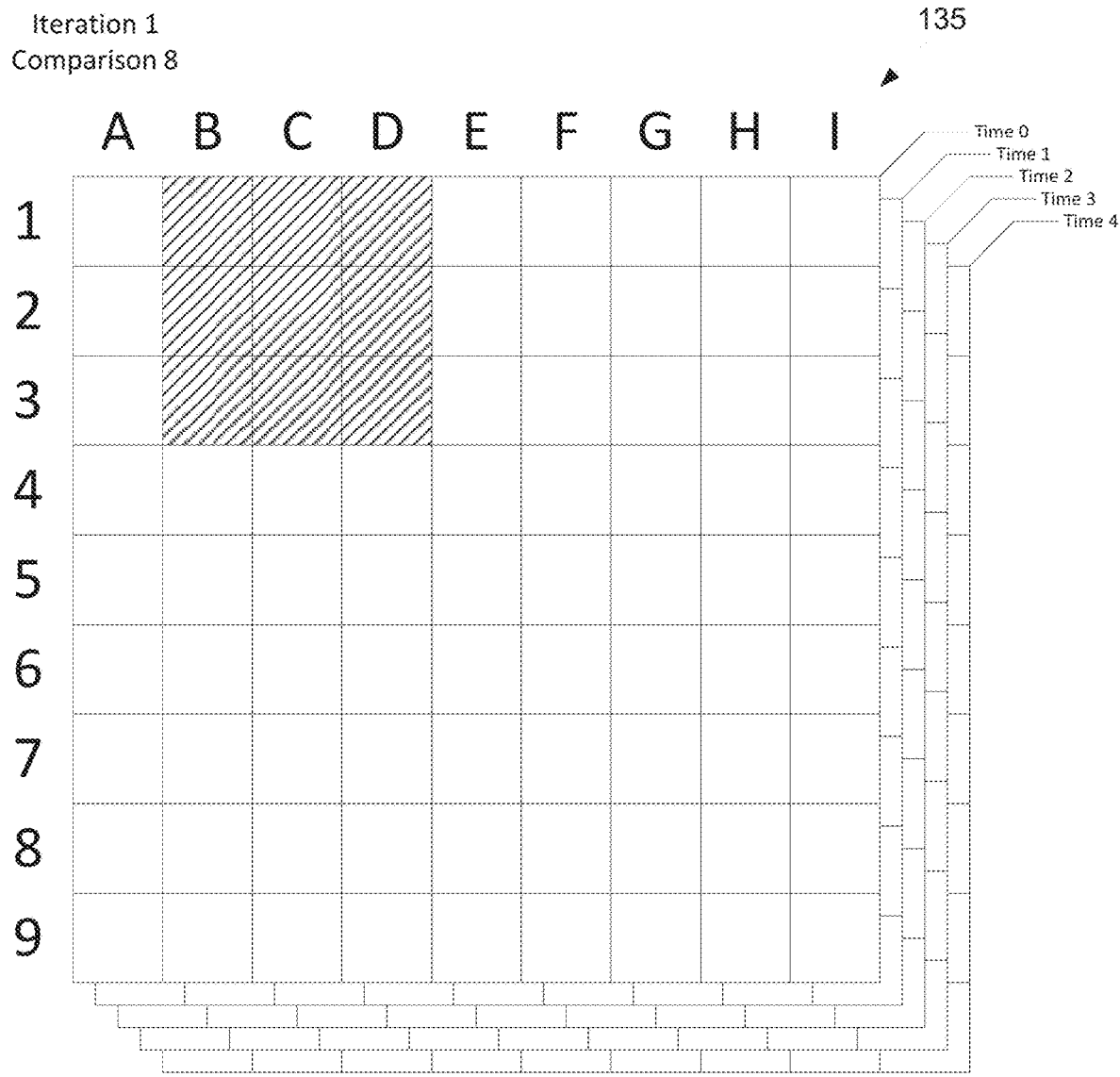
Figure 4B:
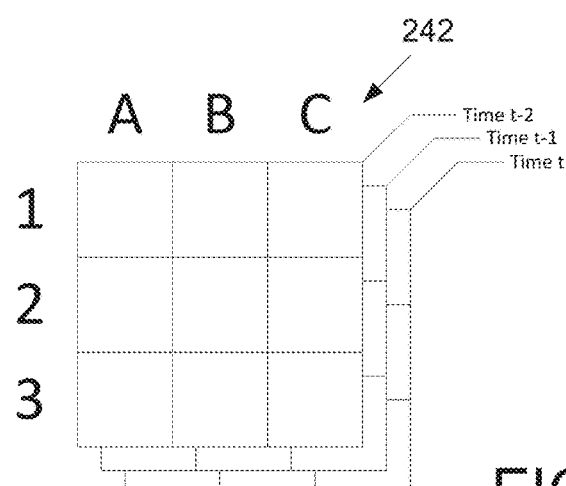
Figure 4C:
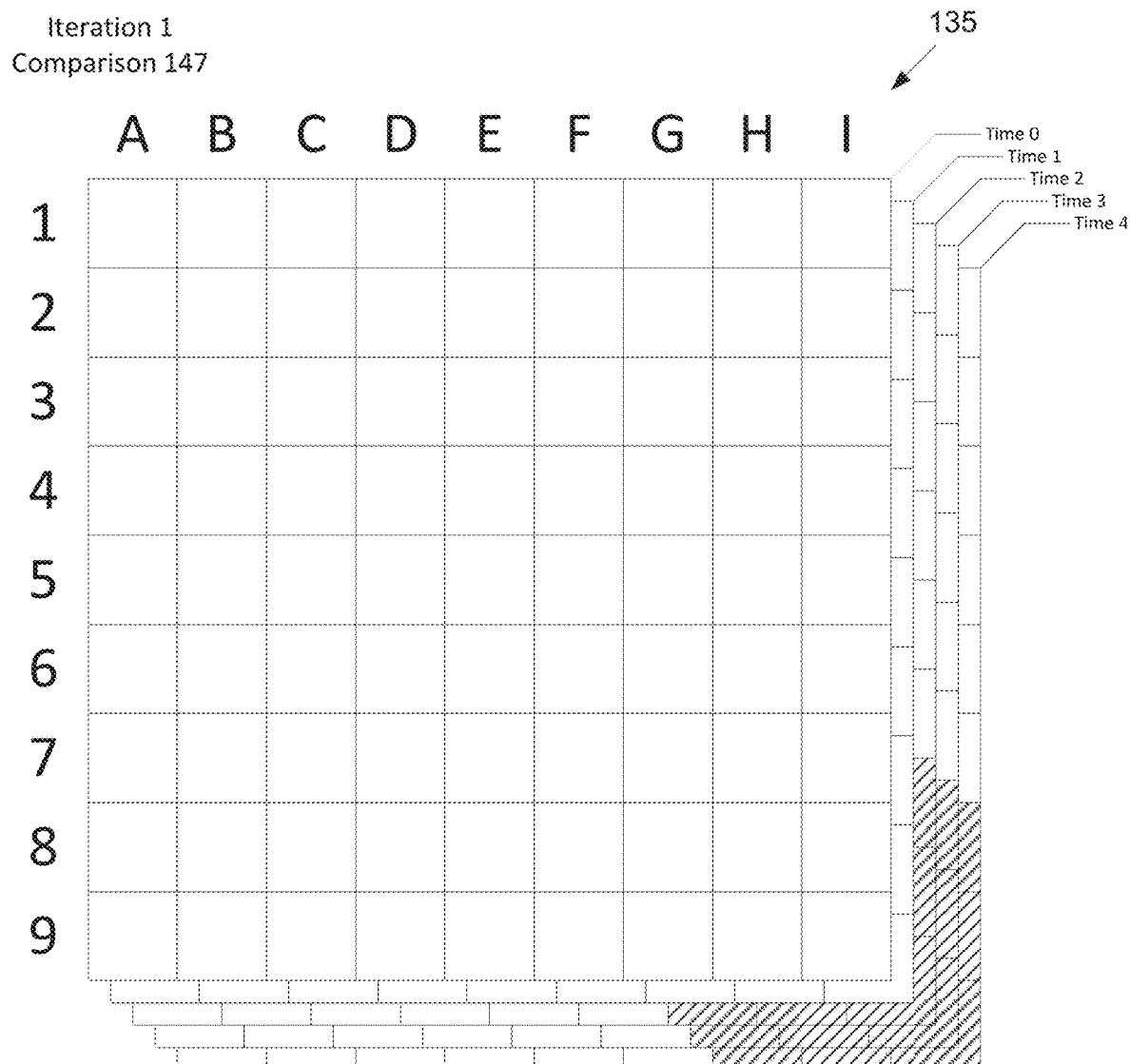

As discussed above, the comparisons may be carried out for each candidate to cover an entirety of the records in database 135. Thus, the next comparison, or comparison 8, considers the candidate represented by [B, 1, 0] through [D, 3, 0], as shown by the shaded portion of database 135 in FIG. 4B. The comparisons continue until reaching the last comparison 147, illustrated in FIG. 4C. As shown in FIG. 4C, the candidate for comparison 147 is represented by [G, 7, 2] through [I, 9, 4]. While the term "last comparison" is used to describe comparison 147, it should be understood that the comparisons can be processed in any order and in parallel, as described above.

In step 332, processor 236 selects a candidate match from the plurality of candidates based on the candidate match having a highest associated similarity value. For example, after step 331, a result 410A may be provided as shown in FIG. 4D. FIG. 4D illustrates example results from search query iterations for providing sliding window pattern matching for large data sets. As shown in FIG. 4D, a result 410A for iteration 1 is shown and a result 410B for a successive iteration 2 is shown. After sorting or traversing result 410A, candidate match 420A may be identified as having a highest similarity value, or similarity value 0.80.

In step 333, processor 236 assigns a confidence value to the candidate match based at least on the associated similarity value and a size of multidimensional search query 242. For example, the confidence value may correspond to the similarity value adjusted by a weight that is based on the size of the multidimensional search query. The weighting may, for example, provide a smaller weight for smaller sizes, since highly localized or small matches may provide less confidence for a good match. Of course, other factors may also be utilized for the confidence value. For iteration 1, since the size of multidimensional search query 242 has not yet been reduced, the weighting may leave the similarity value as-is. Thus, candidate match 420A is assigned a confidence value of 0.80.

In step 334, processor 236 reduces the size of multidimensional search query 242. For example, as shown in FIG. 4D, the size may be reduced by an increment of 1 in the X and Y dimensions. However, the size reduction may also be based on a percentage reduction or other factors, and may affect one or more selected dimensions, or cycle through the dimensions.

In step 335, processor 236 determines whether an optimal confidence value has been found. This determination may be based on comparing to previous iterations. In this example, since this is the first iteration, the determination may be "no" and process 313 returns to step 331 to continue to another iteration of steps 331, 332, 333, and 334. However, assume that both the first iteration and second iterations have been completed, and the results are as shown in FIG. 4D. In result 410B for iteration 2, the similarity values may be adjusted by a factor of 80% to generate the confidence values to account for the smaller 2×2×3 size for multidimensional search query 242. Accordingly, the highest confidence value of iteration 2 is 0.64 for candidate match 420B, which is less than the highest confidence value of iteration 1 of 0.80 for candidate match 420A. Processor 236 may thus conclude further iterations will move away from the optimal solution, and thus process 313 may end and candidate match 420A may be selected as the candidate with the optimal confidence value. When step 314 is reached when returning back to process 300, the prediction result may be selected from the successive records, or records [B, 1, 3]–[D, 3, 3] of database 135 to forecast tomorrow's weather at the requested position.

In cases where there are no successive records to examine, the system may wait until such records are added to database 135 to provide the prediction result. For example, if a match occurs to a region in a future time zone, then data points for that region may be observed and retrieved in time to provide a timely prediction result.

Note that multiple matches may also be used to provide an averaged result, as discussed above. The averaged result may also help to avoid the situation described above where no successive records are available to examine. For example, assume that the top two closest matches are selected to be averaged. In this case, comparison 8 and comparison 9 in iteration 1 correspond to the top matches with confidence values of 0.80 and 0.62 respectively. Based on this, records [B, 1, 3]–[D, 3, 3] and [B, 2, 3]–[D, 4, 3] may be averaged together to provide the prediction result. In some aspects of the present technology, the averaging may be by weighting each component by the respective confidence value.

Hardware Overview

Figure 5:
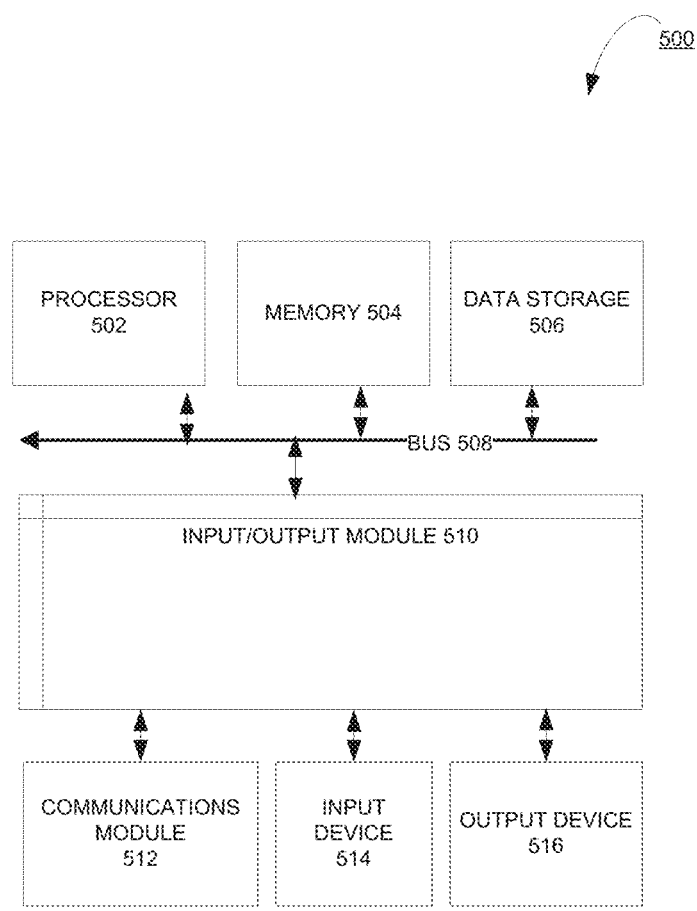
FIG. 5 is a block diagram illustrating an example computer system with which the clients and servers of FIG. 2 can be implemented.

FIG. 5 is a block diagram illustrating an example computer system 500 with which the client 110A and server 130 of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., client 110A and server 130) includes a bus 508 or other communication mechanism for communicating information, and a processor 502 (e.g., processor 212, 236) coupled with bus 508 for processing information. According to one aspect, the computer system 500 can be a cloud computing server of an IaaS that is able to support PaaS and SaaS services. According to one aspect, the computer system 500 is implemented as one or more special-purpose computing devices. The special-purpose computing device may be hard-wired to perform the disclosed techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices, or any other device that incorporates hard-wired and/or program logic to implement the techniques. By way of example, the computer system 500 may be implemented with one or more processors 502. Processor 502 may be a general-purpose microprocessor, a microcontroller, a Digital Signal Processor (DSP), an ASIC, a FPGA, a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 220, 260, and 240), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry. Expansion memory may also be provided and connected to computer system 500 through input/output module 510, which may include, for example, a SIMM (Single In Line Memory Module) card interface. Such expansion memory may provide extra storage space for computer system 500, or may also store applications or other information for computer system 500. Specifically, expansion memory may include instructions to carry out or supplement the processes described above, and may include secure information also. Thus, for example, expansion memory may be provided as a security module for computer system 500, and may be programmed with instructions that permit secure use of computer system 500. In addition, secure applications may be provided via the SIMM cards, along with additional information, such as placing identifying information on the SIMM card in a non-hackable manner.

The instructions may be stored in the memory 504 and implemented in one or more computer program products, e.g., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network, such as in a cloud-computing environment. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices (e.g., input device 216, display device 214). The input/output module 510 can be any input/output module. Example input/output modules 510 include data ports such as USB ports. In addition, input/output module 510 may be provided in communication with processor 502, so as to enable near area communication of computer system 500 with other devices. The input/output module 510 may provide, for example, wired communication in some implementations, or wireless communication in other implementations, and multiple interfaces may also be used. The input/output module 510 is configured to connect to a communications module 512. Example communications modules 512 (e.g., communications module 218, 258, and 238) include networking interface cards, such as Ethernet cards and modems.

The components of the system can be interconnected by any form or medium of digital data communication (e.g., a communication network). The communication network (e.g., communication network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

For example, in certain aspects, communications module 512 can provide a two-way data communication coupling to a network link that is connected to a local network. Wireless links and wireless communication may also be implemented. Wireless communication may be provided under various modes or protocols, such as GSM (Global System for Mobile Communications), Short Message Service (SMS), Enhanced Messaging Service (EMS), or Multimedia Messaging Service (MMS) messaging, CDMA (Code Division Multiple Access), Time division multiple access (TDMA), Personal Digital Cellular (PDC), Wideband CDMA, General Packet Radio Service (GPRS), or LTE (Long-Term Evolution), among others. Such communication may occur, for example, through a radio-frequency transceiver. In addition, short-range communication may occur, such as using a BLUETOOTH, WI-FI, or other such transceiver.

In any such implementation, communications module 512 sends and receives electrical, electromagnetic, or optical signals that carry digital data streams representing various types of information. The network link typically provides data communication through one or more networks to other data devices. For example, the network link of the communications module 512 may provide a connection through local network to a host computer or to data equipment operated by an Internet Service Provider (ISP). The ISP in turn provides data communication services through the world wide packet data communication network now commonly referred to as the "Internet." The local network and Internet both use electrical, electromagnetic, or optical signals that carry digital data streams. The signals through the various networks and the signals on the network link and through communications module 512, which carry the digital data to and from computer system 500, are example forms of transmission media.

Computer system 500 can send messages and receive data, including program code, through the network(s), the network link, and communications module 512. In the Internet example, a server might transmit a requested code for an application program through the Internet, the ISP, the local network, and communications module 512. The received code may be executed by processor 502 as it is received, and/or stored in data storage 506 for later execution.

In certain aspects, the input/output module 510 is configured to connect to a plurality of devices, such as an input device 514 (e.g., input device 216) and/or an output device 516 (e.g., display device 214). Example input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Example output devices 516 include display devices, such as an LED (light emitting diode), CRT (cathode ray tube), LCD (liquid crystal display) screen, a TFT LCD (Thin-Film-Transistor Liquid Crystal Display) or an OLED (Organic Light Emitting Diode) display, for displaying information to the user. The output device 516 may comprise appropriate circuitry for driving the output device 516 to present graphical and other information to a user.

According to one aspect of the present disclosure, the client 110A can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. Processor 502 may process the executable instructions and/or data structures by remotely accessing the computer program product, for example by downloading the executable instructions and/or data structures from a remote server through communications module 512 (e.g., as in a cloud-computing environment). In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. For example, some aspects of the subject matter described in this specification may be performed on a cloud-computing environment. Accordingly, in certain aspects, a user of systems and methods as disclosed herein may perform at least some of the steps by accessing a cloud server through a network connection. Further, data files, circuit diagrams, performance specifications, and the like resulting from the disclosure may be stored in a database server in the cloud-computing environment, or may be downloaded to a private storage device from the cloud-computing environment.

Computing system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer-readable medium" as used herein refers to any medium or media that participates in providing instructions or data to processor 502 for execution. The term "storage medium" as used herein refers to any non-transitory media that store data and/or instructions that cause a machine to operate in a specific fashion. Such a medium may take many forms, including, but not limited to, non-volatile media, volatile media, and transmission media. Non-volatile media include, for example, optical disks, magnetic disks, or flash memory, such as data storage device 506. Volatile media include dynamic memory, such as memory 504. Transmission media include coaxial cables, copper wire, and fiber optics, including the wires that comprise bus 508. Common forms of machine-readable media include, for example, a floppy disk, a flexible disk, a hard disk, magnetic tape, any other magnetic medium, a CD-ROM, a DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire, and fiber optics, including the wires that comprise bus 508. Transmission media can also take the form of acoustic or light waves, such as those generated during radio-wave and infra-red data communications. Furthermore, as used in this specification of this application, the terms "computer," "server," "processor," and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first, second, and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public, regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately, or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A system for providing sliding window pattern matching for large data sets, the system comprising:
    a memory; and
    a processor configured to execute instructions which, when executed, cause the processor to:
        access a data store comprising a plurality of records each associated with a timestamp and at least one type of measurement value;
        retrieve a multidimensional search query spanning a defined length of time;
        compare, in parallel, each of a plurality of candidates to the multidimensional search query using an optimization function to determine an associated similarity value, wherein the plurality of candidates cover an entirety of the plurality of records, and wherein the optimization function uses at least one of sparse pattern matching and relative pattern matching;
        select a candidate match from the plurality of candidates based on the candidate match having a highest associated similarity value;
        assign a confidence value to the candidate match based at least on the associated similarity value and a size of the multidimensional search query;
        reduce the size of the multidimensional search query and adjust weighting of the associated similarity values to account for the reduced size of the multidimensional search query;
        repeat the comparing, selecting, assigning, and reducing until an optimal confidence value is determined; and
        output a prediction result selected from the plurality of records having associated timestamps after the candidate match assigned to the optimal confidence value.

2. The system of claim 1, wherein the processor is configured to retrieve the multidimensional search query from the plurality of records.

3. The system of claim 1, wherein the processor is configured to compare by skipping a portion of the plurality of candidates that contains the multidimensional search query.

4. The system of claim 1, wherein the at least one type of measurement value comprises floating point values.

5. The system of claim 1, wherein the processor is further configured to:
    receive an actual result;
    determine a difference between the prediction result and the actual result; and
    adjust, based on the difference, at least one of: the optimization function, the defined length of time, or a size of a subsequent multidimensional search query.

6. The system of claim 1, wherein the processor is configured to retrieve the multidimensional search query in response to receiving a prediction query from a client.

7. The system of claim 1, wherein the processor is configured to output by averaging the prediction result for multiple candidate matches nearest the optimal confidence value.

8. The system of claim 1, wherein the processor is further configured to:
    provide for display, on a display device, the prediction result.

9. A non-transitory machine-readable storage medium comprising machine-readable instructions for causing a processor to execute a method for providing sliding window pattern matching for large data sets, comprising:
    accessing a data store comprising a plurality of records each associated with a timestamp and at least one type of measurement value;

retrieving a multidimensional search query spanning a defined length of time;

comparing, in parallel, each of a plurality of candidates to the multidimensional search query using an optimization function to determine an associated similarity value, wherein the plurality of candidates cover an entirety of the plurality of records, and wherein the optimization function uses at least one of sparse pattern matching and relative pattern matching;

selecting a candidate match from the plurality of candidates based on the candidate match having a highest associated similarity value;

assigning a confidence value to the candidate match based at least on the associated similarity value and a size of the multidimensional search query;

reducing the size of the multidimensional search query and adjusting weighting of the associated similarity value to account for the reduced size of the multidimensional search query;

repeating the comparing, selecting, assigning, and reducing until an optimal confidence value is determined; and outputting an averaged prediction result selected from the plurality of records having associated timestamps after multiple candidate matches most closely assigned to the optimal confidence value.

* * * * *